(12) United States Patent
Tsai

(10) Patent No.: US 8,592,702 B2
(45) Date of Patent: Nov. 26, 2013

(54) ILLUMINANT KEYBOARD DEVICE

(75) Inventor: Ching-Cheng Tsai, Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 182 days.

(21) Appl. No.: 13/298,265

(22) Filed: Nov. 16, 2011

(65) Prior Publication Data

US 2013/0121017 A1    May 16, 2013

(51) Int. Cl.
*H01H 9/00* (2006.01)

(52) U.S. Cl.
USPC ........ 200/311; 362/23.03; 200/314; 200/296; 200/344

(58) Field of Classification Search
USPC .......... 200/311, 310, 312, 313, 314, 5 A, 5 R, 200/341, 342, 343, 344, 345, DIG. 47, 512; 362/23.03, 23.05, 23.07, 23.1, 23.13, 362/23.14, 23.16
See application file for complete search history.

(56) References Cited

U.S. PATENT DOCUMENTS

| | | | | |
|---|---|---|---|---|
| 5,763,842 A * | 6/1998 | Tsai et al. | | 200/5 A |
| 6,554,442 B2 * | 4/2003 | Chou | | 362/85 |
| 2006/0011459 A1 * | 1/2006 | Chou | | 200/314 |
| 2012/0235837 A1 * | 9/2012 | Tsai et al. | | 341/22 |
| 2013/0146435 A1 * | 6/2013 | Tsai | | 200/517 |

* cited by examiner

*Primary Examiner* — Renee S Luebke
*Assistant Examiner* — Harshad Patel
(74) *Attorney, Agent, or Firm* — Chun-Ming Shih; HDLS IPR Services

(57) ABSTRACT

A illuminant keyboard device includes a bottom frame having a plurality of latch parts, a plurality of keying units disposed on the bottom frame, a membrane switch interposed between the bottom frame and the keying units, a light guide plate interposed between the membrane switch and the bottom frame, a least a light source disposed on predetermined position of the light guide plate, a plate interposed between the membrane switch and the light guide plate and a light-shielding plate interposed between the membrane switch and the keying units. The light guide plate has a plurality of first holes and the plate has a plurality of second holes, the diameter of each of the first holes is larger than the diameter of each of the second holes.

14 Claims, 5 Drawing Sheets

ILLUMINANT KEYBOARD DEVICE

BACKGROUND OF THE INVENTION

1. Field of the Invention

The present invention relates to a keyboard device, and in particular to an illuminant keyboard device.

2. Description of Prior Art

In order to provide convenience for operator in a dark environment or a dim room where enough illumination light is not provides, an illuminant device is provided for keyboards of computers or mobile phones and then operator can clearly recognize the letters of the keycaps.

Reference is made to FIG. 1 and FIG. 2, which are respectively a sectional view and a partially enlarged view of a conventional illuminant keyboard device. The keyboard device 10 includes a bottom frame 100, a plurality of keying units 110, a membrane switch 120, a plurality of elastic member 130 and an illuminant module 140.

The bottom frame 100 has a plurality of latch parts 102. The keying units 11 are disposed on the bottom frame 100. Each keying unit 110 includes a keycap 112 which can move upward and downward corresponding to the bottom frame 100 and a linking mechanism 114 interposed between the bottom frame 100 and the keycap 112 so as to be able to expand and contract and thereby support the keycap 112. In this embodiment, the linking mechanism 104 intersects in the shape of X to form a scissor structure.

The membrane switch 120 is interposed between the bottom frame 100 and the keying units 110. The membrane switch 120 may be made of materials having optical transparency and is provided with conductive traces (not shown) and contacts 122 thereon. The contacts 122 are electrically connected to the conductive traces and correspond to the keycaps 112.

The elastic members 130 are interposed between the membrane switch 120 and the keycaps 112 and located above the contacts 122. The elastic members 130 are always elastically pushed up the keycaps 112 toward the standby position by urging force.

If a desire keycap 112 is pressed against the elastic force of the elastic member 130, the elastic member 130 is gradually deformed and touches the membrane switch 120. As the result, the contacts 120 formed on the membrane switch 120 are conducted, and thus the membrane switch 120 is turned on and generates a signal corresponding to the letters.

The illuminant module 140 includes a plurality light emitting diodes (LEDs) 142, a light guide plate 133 and a diffusing plate 146. The light guide plate 144 has a light-incident surface 1440, a light-emitting surface 1442 and a plurality of via-holes 1444 allowing the latch parts 102 protruded therethrough. The LEDs 142 is disposed on the light-incident surface 1440 and emitting light to the light-incident surface 1440. Light emitted by the LED 142 is incident on the inside of the light guide plate 144 from the light-incident surface 1440 and emitting by light-emitting surface 1442.

The diffusing plate 146 is interposed between the light guide plate 144 and the membrane switch 120. Light emitted from the light-emitting surface 1442 is then incident to the diffusing plate 146. The diffusing plate 146 diffuses light and then generates a surface light source with uniform illumination. The diffusing plate 146 includes a plurality of through-holes 1460 allowing the latch parts 102 protruded therethrough and the diameter of each of the through-holes 1460 is equal to the diameter of each of the via-holes 1444 formed on the light guide plate 144.

Part of light emitted by LEDs 142 is incident to light guide plate 144 from the light-incident surface 1440 and passing through the inside of the light guide plate 144 and emitting by the light-emitting surface 1442, and part is refracted by the hole-wall of the via-holes 1444. Because the diameter of each of the via-holes 1444 is equal to the diameter of each of the through-holes 1460, the light refracted from the via-holes 1444 are directly traveling to the keying units 110 through the through-holes 1460. Therefore, a part of light leaks out from gaps located between each two keying units 110, and the luminance of the illuminant keyboard device 10 is non-uniform and increases the difficulty of recognizing the letters of the keycaps 112.

SUMMARY OF THE INVENTION

It is an object of the present invention to provide an illuminant keyboard device, the illuminant keyboard device can reduce light leaked out from gaps located between each two keying units, and then reduces the difficulty of recognizing the letters of the keycaps.

Accordingly, the present invention provides a illuminant keyboard device includes a bottom frame, a plurality of keying units, a membrane switch, a light guide plate, at least a light source, a plate and a light-shielding plate. The bottom frame has a plurality of latch parts. The keying units are disposed on the bottom frame. The membrane switch is interposed between the bottom frame and the keying units. The light guide plate is interposed between the membrane switch and the bottom frame, the light guide plate has a light-incident surface and a plurality of first holes allowing the latch parts protruded therethrough. The light source is dispose on predetermined position of the light-incident surface. The plate is interposed between the light guide plate and the membrane switch, the plate has a plurality of second holes allowing the latch parts protruded therethrough. The light-shielding plate is interposed between the membrane switch and the keying units. A diameter of each of the first holes is larger than an diameter of each of second holes. In more particularly, the diameter of each of the first holes is 1.2 times larger than the diameter of each of the second holes.

In the present invention, the diameter of each of the first holes formed on the light guide plate is larger than the diameter of each of the second holes formed on the plate, and the diameter of each of the first holes is 1.2 times larger than the diameter of each of the second holes. As a result, the illuminant keyboard device can effectively prevent light from directly travelling to gaps located between each two keycaps through the second holes and the through-holes and reduce the difficulty of recognizing the letters of the keycaps.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

A preferred embodiment of the present invention will be described with reference to the drawings.

Figure 1:
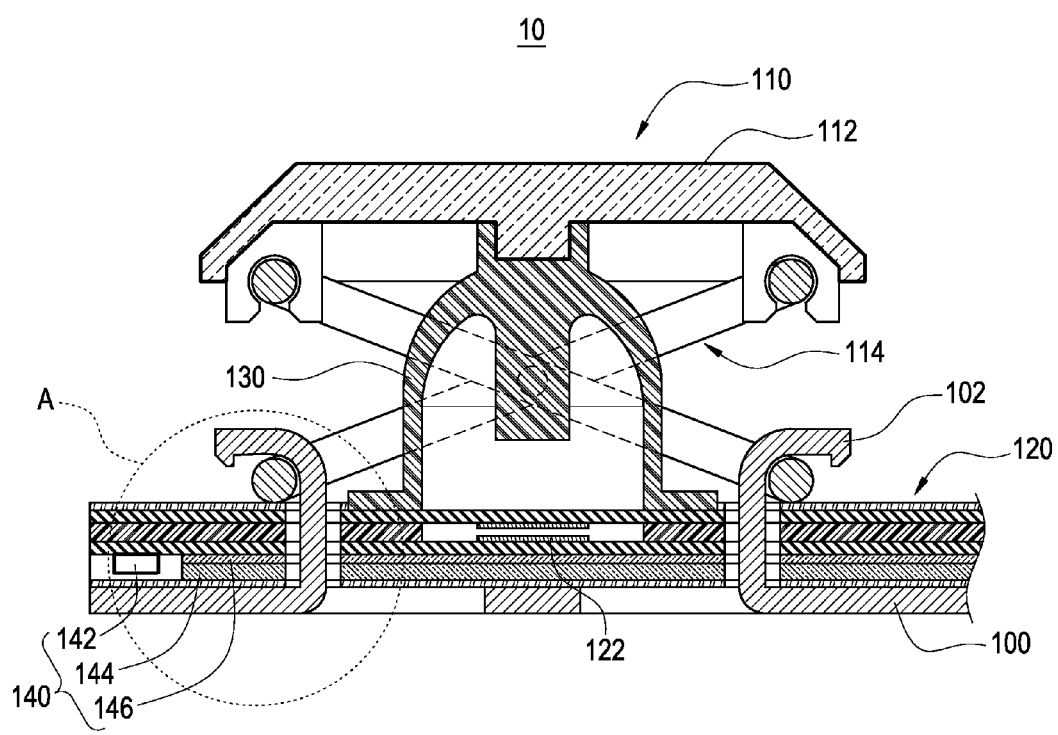
FIG. 1 is a sectional view of a conventional illuminant keyboard device.
Figure 2:
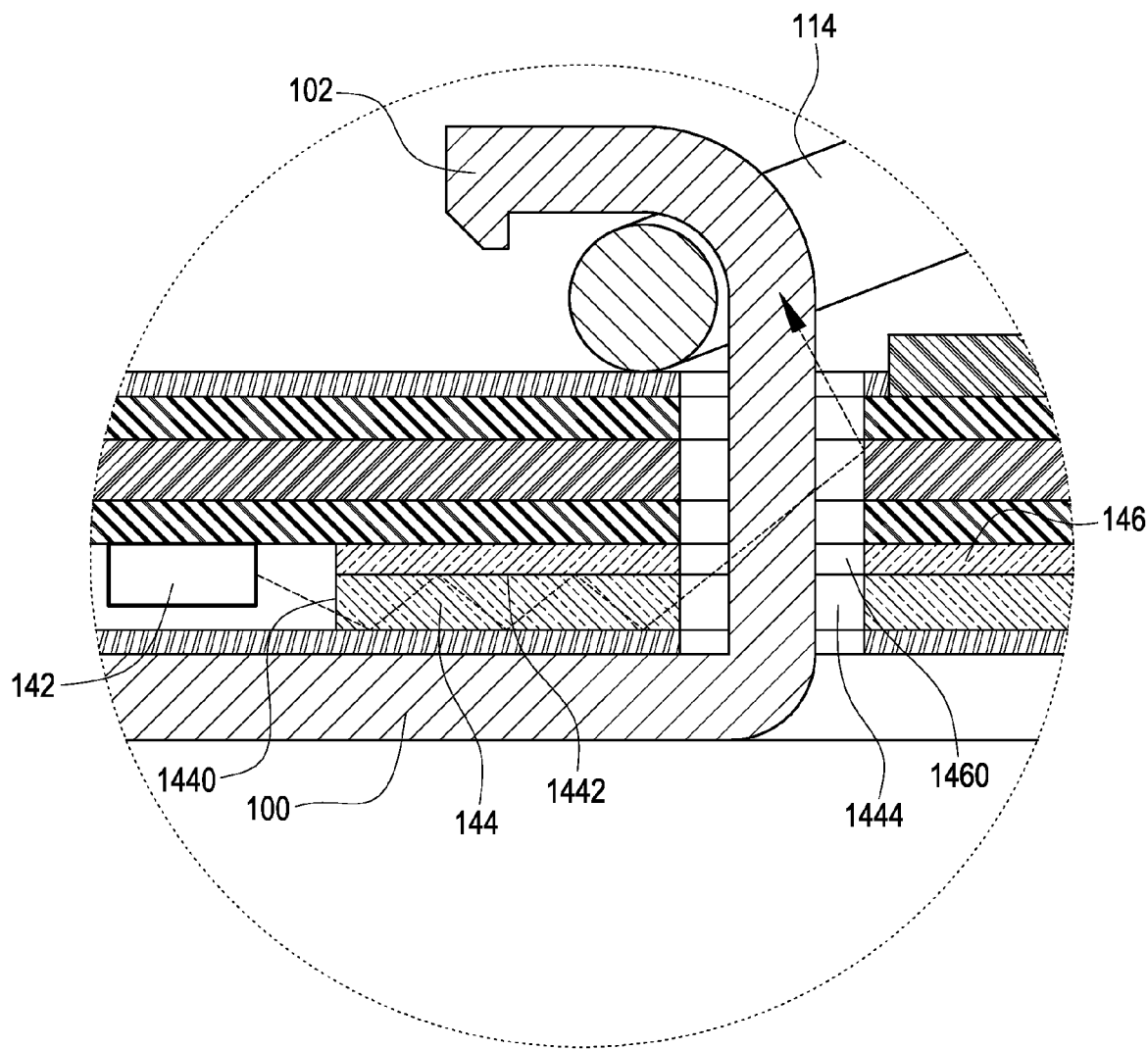
FIG. 2 is a partially enlarged view of the conventional illuminant keyboard device.
Figure 3:
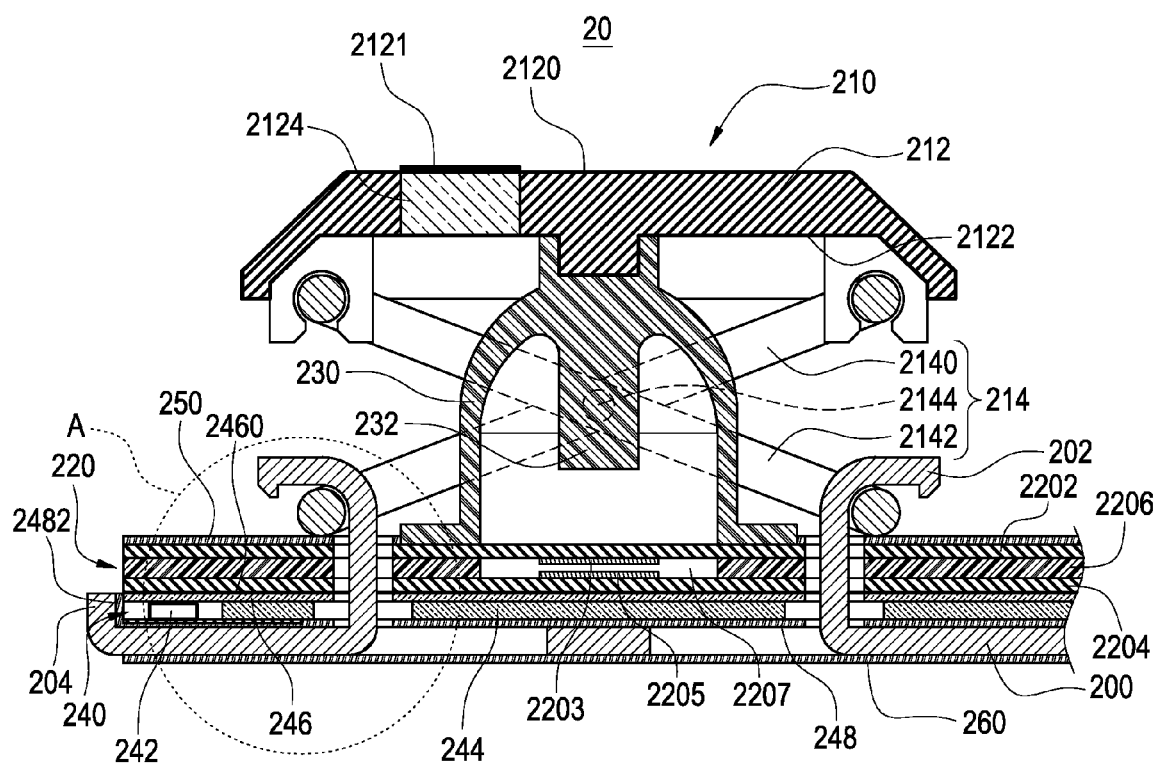
FIG. 3 is a partially sectional view of an illuminant keyboard device according to a preferred embodiment of the present invention.

Reference is made to FIG. 3, which is a sectional view of an illuminant keyboard device according to a preferred embodiment of the present invention. The illuminant keyboard device 20 includes a bottom frame 200, a plurality of keying units 210, a membrane switch 220, a plurality of elastic members 230, an illuminant module 240 and a light-shielding plate 250.

The bottom frame 200 is preferably made of a metal plate for supporting the illuminant keyboard device 20. The bottom frame 20 has a plurality of latch parts 202 protruded upward from the bottom frame 20, and the forming step of latch parts 202 is preferably, but not limited to, accomplished using stamping process.

The keying units 210 are arranged on the bottom frame 200 in a matrix fashion according to a rule defined in advance. Each keying unit 210 includes a keycap 212 and a linking mechanism 214. The keycap 212 is substantially rectangular-shaped and includes a pressing surface 2120 and an assembling surface 2122. The pressing surface 2120 can be pressed by user and at least a letter 2121 is disposed on the pressing surface 2120. The keycap 212 further includes at least an optical-transparent area 2124 corresponded to the letter 2121. The optical-transparent area 2124 may be transparent or translucent for allowing light travel from the assembling surface 2122 to the pressing surface 2120 and light up the letter 2121.

The linking mechanism 214 is interposed between the bottom frame 200 and the keycap 212, the linking mechanism 214 is made of a transparent or translucent resin material having optical transparency and includes a first lever 2140 and a second lever 2142. One end of the first lever 2140 and the second lever 2142 are connected to the assembling surface 2122 and another end of the first lever 2140 and the second lever 2142 are pivot on the latch parts 202. In addition, the first lever 2140 and the second lever 2142 intersect in the shape of X and coupled with each other at the intersect part via a pivot axis 2144. Thereby, the keycap 212 is movably supported on the bottom frame 200 by the first lever 2140 and the second lever 2142 and moving upward or downward corresponding to the bottom frame 200.

The membrane switch 220 is designed to electrically detect whether the keycaps 212 are depressing or not, and generates an inputting signal corresponding to the depressed keycap 212. The inputting signal is sent to a keyboard controller (not shown).

The membrane switch 220 is interposed between the bottom frame 200 and the keyboard switch 210. The membrane switch 220 includes an upper sheet 2202, a lower sheet 2204 and an insulating sheet 2206 placed between the upper sheet 2202 and the lower sheet 2204. The insulating sheet 2206 has a plurality of openings 2207 corresponding to the keycaps 212. The upper sheet 2202 is provided with conductive traces (not shown) and fixed contacts 2203 thereon, the lower sheet 2204 is provided with conductive traces (not shown) and fixed contacts 2205 thereon, and the movable contacts 2203 face the fixed contacts through the opening 2207.

The elastic members 230 are placed between the keycaps 212 and the upper sheet 2202 of the membrane switch 220 and corresponding to the keycaps 212. In the practical application, the elastic members 230 may be directly formed on the upper sheet 2202, or fastened on the upper sheet 2202 through an adhesive. The elastic members 230 are used to provide urging force and elastically press up the keycaps 212. Each elastic member 230 has a projecting part 232 immediately located above the movable contact 2203 of the membrane switch 220.

When the keycap 212 is depressed, the first lever 2140 and the second lever 2142 move downward. The elastic member 230 is compressed and the projecting part 232 presses the upper sheet 2202 of the membrane switch 220. At the same time, the upper sheet 2202 is bent and the movable contact 2203 is brought into contact with the flexible contact 2205. Thereby, the operation of depressing keycap 212 is electrically detected and an input signal is sent to keyboard controller from the membrane switch 220.

When the depression of the keycap 212 is released, the keycap 212 is pushed up from the depressed position to the standby position by urging force of the elastic member 230. At the same time, the projecting part 232 of the elastic member 230 is separated from the upper sheet 2202. Thereby, the movable contact 2203 is separated from the fixable contact 2205.

The illuminant device 240 is used for lighting up the illuminant keyboard device 20. The illuminant device 240 includes at least a light source 242, a first light guide plate 244, a plate 246 and first reflecting plate 248. In the practical application, the light source 242 may be light emitting diodes (LED), compact lamp or fluorescent tube and the number of the light source 242 may be one or more, and in this embodiment, the number of the light source 242 is, for example, one.

Figure 4:
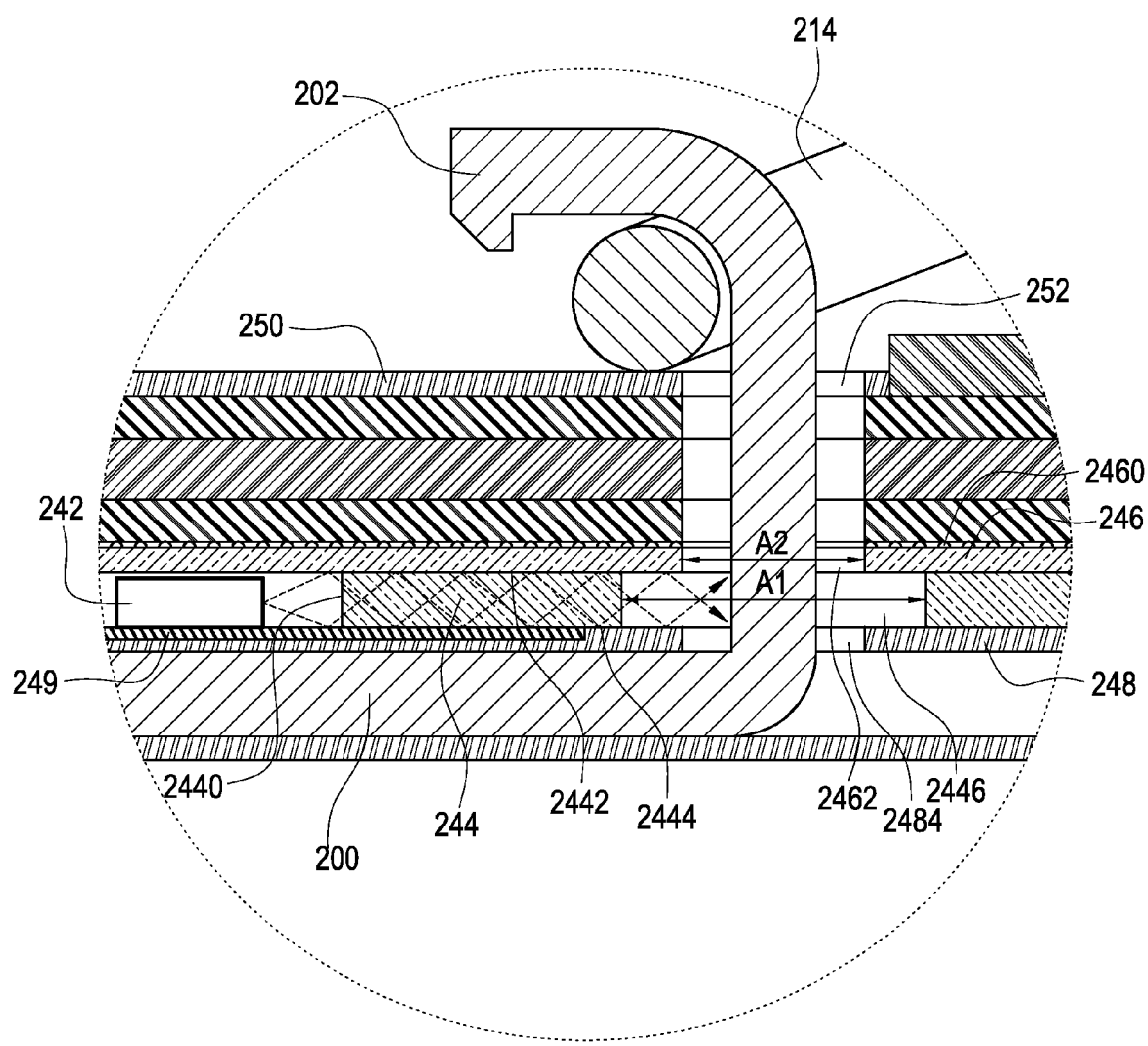
FIG. 4 is a partially enlarged view of the illuminant keyboard device according to the preferred embodiment of the present invention.

Reference is made to FIG. 4, which is a partially enlarged view of the illuminant keyboard device according to the preferred embodiment of the present invention. The light guide plate 244 is made of optical transparency material, such as PMMA, acryl, PC, PET, polylefines or glass by injection, etching, hot pressing or cutting process. The light guide plate 244 is interposed between the bottom frame 200 and the membrane switch 220 and includes a lateral 2440, an upper surface 2442 and a lower surface 2444. The upper surface 2442 is a light-emitting surface of the light guide plate 244 and abutted the lateral surface 2440. The lower surface 2444 is opposite to the upper surface 2442 and abutted the lateral surface 2440. The light source 242 is located on predetermined position of the light guide plate 244. In this embodiment, the light source 242 is located on the lateral surface 2440 of the light guide plate 244 to form an edge-lighting backlight module. The light source 242 is preferably located on the widthwise lateral of the light guide plate 244. In the practical application, the light source 242 may be located on the lengthwise lateral of the light guide plate 244, or the light source 242 may be located on the lower surface 2444 of the light guide plate 244 to form a bottom-lighting backlight module.

The light guide plate 244 further includes a plurality of first holes 2446 allowing the latch parts 202 protruded therethrough and each first hole 2446 has a first diameter A1.

The plate 246 is placed between the first light guide plate 244 and the membrane switch 220, the second light guide plate 246 is formed of synthetic resinous materials having optical transparency. The plate 246 has a light guide ink layer 2460, the light guide ink layer 2460 is disposed on an upper surface of the plate 246 for diffusing light that penetrates the first light guide plate 244 and come into the light guide plate 244 to generate a surface light source with uniform illumination. The plate 246 includes a plurality of second holes 2462 allowing the latch parts 232 protruded therethrough. Each second hole 2462 has a second aperture diameter A2, and the second diameter A2 is smaller than the first diameter A1 of the first hole 2445, and preferably the first diameter A1 of each of the first holes 2446 is 1.2 times larger than the second diameter A2 of each of the second holes 2462.

Figure 5:
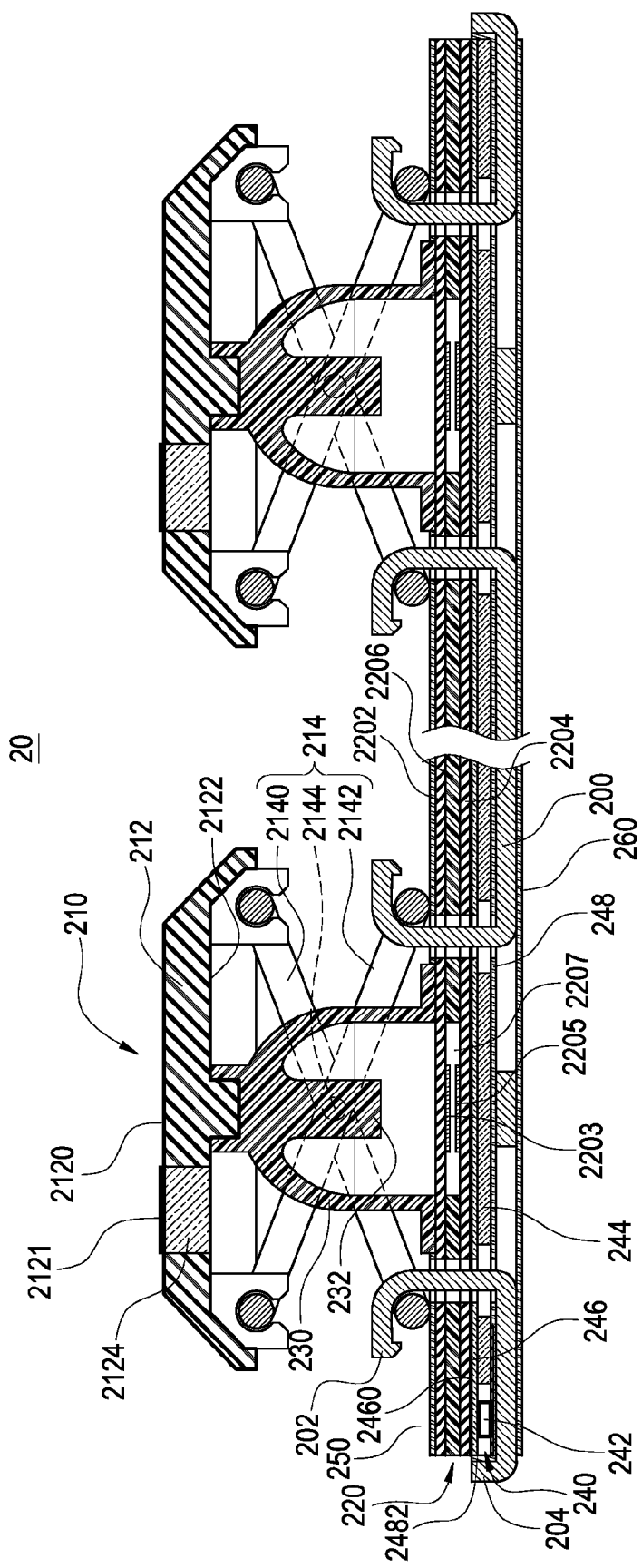
FIG. 5 is a sectional view of the illuminant keyboard device according to the preferred embodiment of the present invention.

The first reflecting plate 248 is interposed between the bottom frame 200 and the light guide plate 244 for reflecting light leaked from the lower surface 2444 of the light guide plate 244 and then improve the utilization efficiency of light. Moreover, a bending arm 2482 is formed on a of the first reflecting plate 248. The bending arm 2482 at least covers the first light guide plate 244 to prevent light leakage from the light guide plate 244 and improve light utilization of light. In this embodiment, the bending arm 2482 is located on the lengthwise direction of the first reflecting plate 248, as shown in FIG. 5, and covers the two lengthwise end-surfaces of the illuminant module 240 to prevent light leakage therefrom. The first reflecting plate 248 is, for example, formed of synthetic resinous material and preferably having white, silver or other colors with preferably reflecting effect. In the practical application, the reflecting color may be adjusted according to different situations or limitation. Alternatively, the reflecting plate 248 may be formed of optical transparency resin, such as UV resin, and is of transparent (or at least semitransparent). The refractive index of the first reflecting plate 248 is smaller than the refractive index of the light guide plate 244. The first reflecting plate 248 includes a plurality of through-holes 2482 allowing the latch parts 202 protruded therethrough, and the diameter of each of the through-holes 2482 is equal to the second diameter A2 of each of the second holes 2462.

The light-shielding plate 250 is interposed between the keying units 210 and the membrane switch 220 and has a plurality of holes 252 allowing the latch parts 202 protruded therethrough. In more particularly, the diameter of each of the holes 252 is equal to the second diameter A2 of each of the second holes 2462.

Most light emitting by the light source 242 is incident to the light guide plate 244 from the lateral 2440 and the travels to the upper surface 2442 and part light refraction by the hole-wall of the first holes 2446. The second diameter A2 of each of the second holes 2462 is smaller than the first diameter A1 of each of the first holes 2446, so as to prevent light directly traveling to gaps located between each two keycaps 212 through the second holes 2462 and the through-holes 252 to from interference light and reduce the difficulty of recognizing the letters of the keycaps 212.

The illuminant device 240 further includes a flexible circuit board 249, the flexible circuit board 249 is placed between the light guide plate 244 and the first reflecting plate 248, as shown in FIG. 4. The light source 242 is electrically connected to the flexible circuit 249. Moreover, when the number of the light source 242 is more than one, the light sources 242 may be electrically connected to the flexible circuit board 249 in serious or in parallel.

Furthermore, a bending part 204 is formed on a circumference of the bottom frame 200 and at least covers the light guide plate 244. Thus the utilization efficiency of the light can be increased by preventing light leaked from the circumference. In this embodiment, the bending part 204 is formed on the lengthwise direction of the bottom frame 200, as shown in FIG. 5, and at least covers the two lengthwise end-surface of the illuminant module 240 to prevent light leak from the two-end surface and then the first reflecting plate 248 can be easily to assemble.

To sum up, in the present invention, the first diameter A1 of each of the first holes 2446 formed on the first light guide plate 244 is larger than the second aperture diameter A2 of each of the second holes 2462 formed on the plate 246, and the first diameter A1 of each of the first holes 2446 is 1.2 times larger than the second diameter A2 of each of the second holes. As a result, the illuminant keyboard device 20 can effectively prevent light from directly travelling to gaps located between each two keycaps 232 through the second holes 2462 and the through-holes 252 and reduce the difficulty of recognizing the letters of the keycaps 232.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. An illuminant keyboard device comprising:
a bottom frame having a plurality of latching parts;
a plurality of keying units disposed on the bottom frame;
a membrane switch interposed between the bottom frame and the keying units;
a light guide plate interposed between the membrane switch and the bottom frame, the light guide plate having a plurality of first holes allowing the latching parts protruded therethrough;
at least a light source disposed on predetermined position of the light guide plate;
a plate interposed between the light guide plate and the membrane switch, the plate having a plurality of second holes allowing the latching parts protruded therethrough;
a light-shielding plate interposed between the membrane switch and the keying units;
wherein the diameter of each of the first holes is larger than the diameter of each of the second holes.

2. The illuminant keyboard device in claim 1, where in the diameter of each of the first holes is 1.2 times larger than the diameter of each of the second holes.

3. The illuminant keyboard device in claim 1, further comprising a first reflecting plate interposed between the bottom frame and the light guide plate.

4. The illuminant keyboard device in claim 3, further comprising a flexible printed circuit board placed between the light guide plate and the first reflecting plate, the light source is disposed on the flexible printed circuit board.

5. The illuminant keyboard device in claim 3, further comprising a second reflecting plate disposed below the bottom frame.

6. The illuminant keyboard device in claim 1, wherein each keying unit comprises a keycap moved upward and downward corresponded to the bottom frame and a linking mechanism interposed between the keycap and the bottom frame.

7. The illuminant keyboard device in claim 6, wherein the linking mechanism comprises a first lever and a second lever pivoting with each other.

8. The illuminant keyboard device in claim 1, further comprises a plurality of elastic members interposed between the keying units and the membrane switch.

9. The illuminant keyboard device in claim 1, wherein the membrane switch comprises an upper sheet, a lower sheet and an insulating sheet having a plurality of opening, the insulating sheet is interposed between the upper sheet and the lower sheet, the upper sheet comprises a plurality of movable contacts, the lower sheet comprises a plurality of fixed contacts, and each movable contact is faced each fixed contact through each opening.

10. The illuminant keyboard device in claim 1, wherein the light-shielding plate comprises a plurality of through-holes, and the diameter of each of the through-holes is equal to the diameter of each of the second holes.

11. The illuminant keyboard device in claim 1, wherein an upper surface of the plate has a light guide ink layer for diffusing light come into the plate.

12. The illuminant keyboard device in claim 1, wherein the light source is light emitting diode, compact lamp or fluorescent tube.

13. The illuminant keyboard device in claim 3, wherein a bending arm is formed on of the first reflecting plate, and the bending arm at least covers the light guide plate.

14. The illuminant keyboard device in claim 1, wherein a bending part is formed on the bottom frame, and the bending part at least covers the light guide plate.

* * * * *